June 4, 1940. N. V. CHRISTENSEN Re. 21,472

FILLED BAG CLOSING UNIT

Original Filed April 23, 1937 2 Sheets-Sheet 1

WITNESSES:
Thomas W. Kerr, Jr.
William Bell, Jr.

INVENTOR:
Norman V. Christensen,
BY Fraley & Paul
ATTORNEYS.

June 4, 1940. N. V. CHRISTENSEN Re. 21,472
FILLED BAG CLOSING UNIT
Original Filed April 23, 1937 2 Sheets-Sheet 2
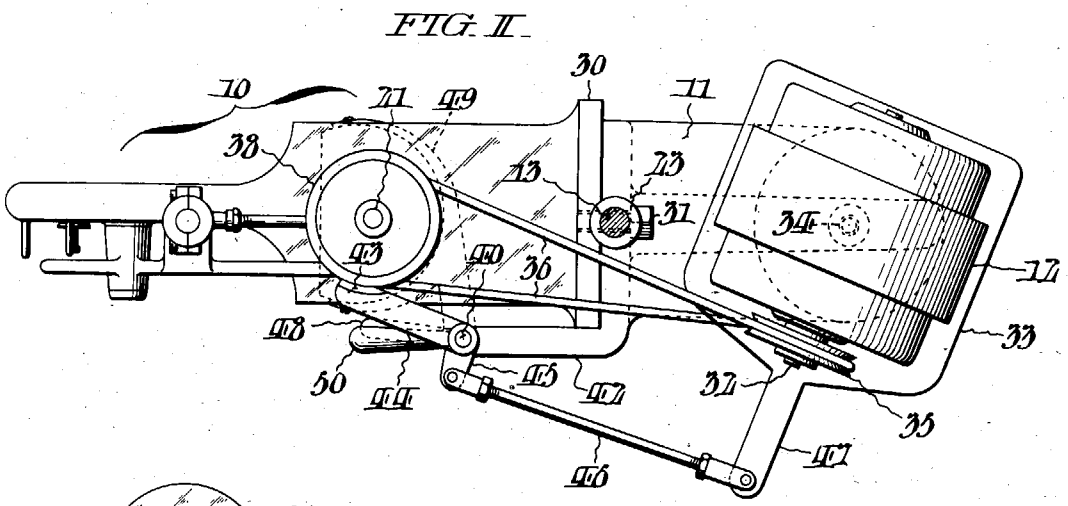
FIG. II.
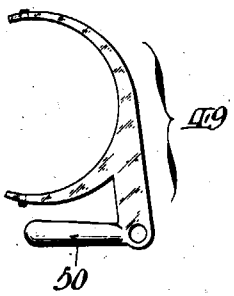
FIG. IV.
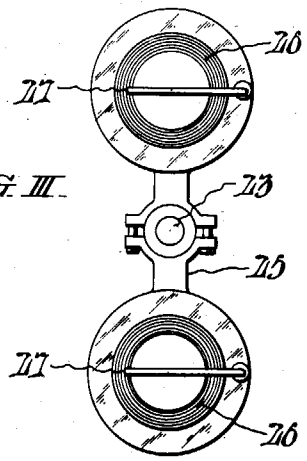
FIG. III.
WITNESSES:
Thomas W. Kerr, Jr.
William Bell, Jr.
INVENTOR:
Norman V. Christensen,
BY Fraley & Paul
ATTORNEYS.

Reissued June 4, 1940

Re. 21,472

UNITED STATES PATENT OFFICE 21,472

FILLED BAG CLOSING UNIT

Norman V. Christensen, Chicago, Ill., assignor to Union Special Machine Company, Chicago, Ill., a corporation of Illinois Original No. 2,156,526, dated May 2, 1939, Serial No. 138,589, April 23, 1937. Application for reissue May 6, 1939, Serial No. 272,278

8 Claims. (Cl. 192—11)

Figure 1:
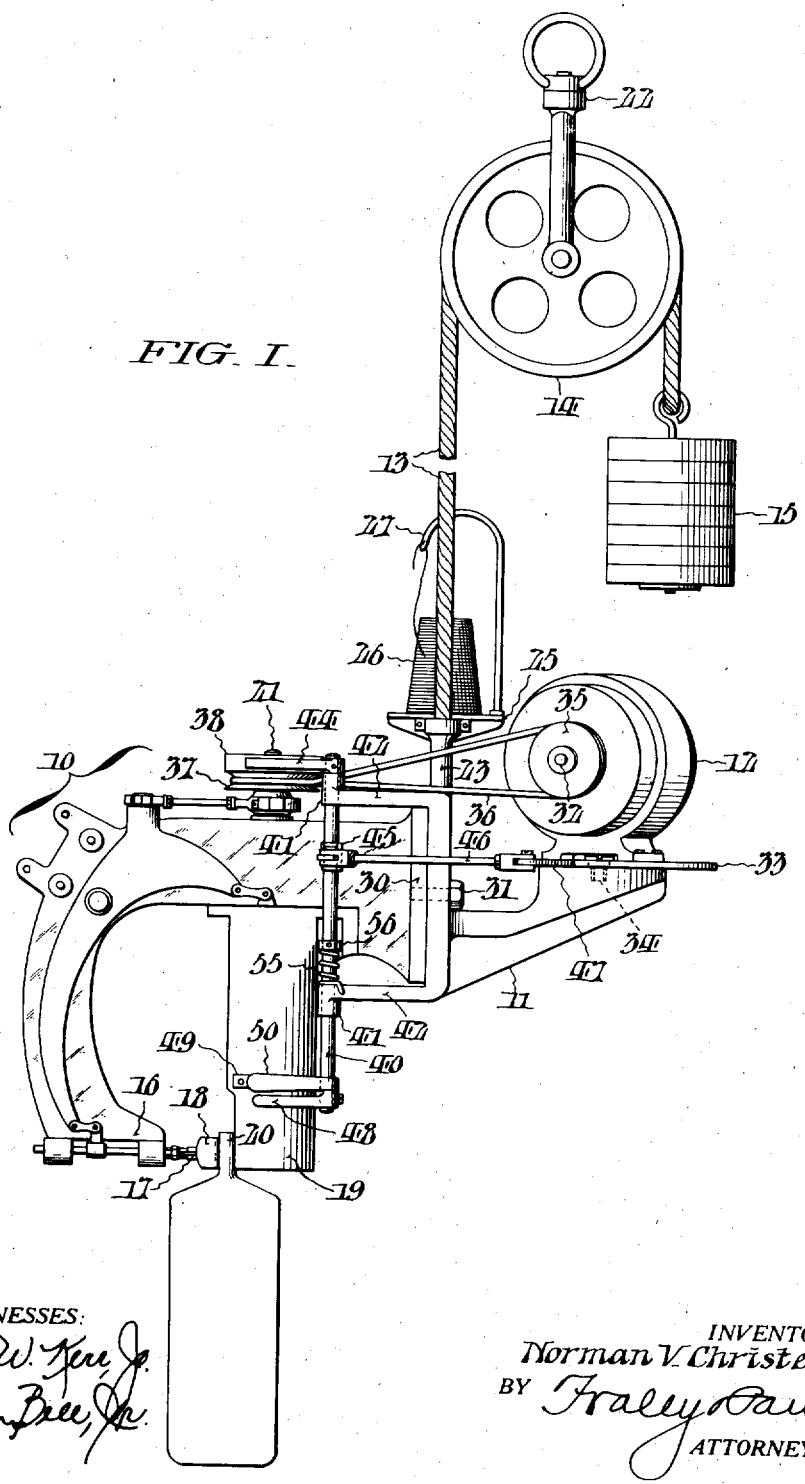

My invention relates to a machine or unit for closing filled bags or sacks and the like, and especially to a self-contained mobile unit for this purpose, that is preferably suspended so that it can be pulled about and raised and lowered at will by an operator. Such freedom of movement of the unit allows it to be conveniently used to fasten shut the mouths of filled bags standing on a floor. I have illustrated and explained my novel unit as including a sewing machine for stitching the bag mouths, this being a preferred method of fastening them shut. Various features and advantages of the invention will appear from the following description of a species or form of embodiment, and from the drawings. All the features shown or described are of my invention, so far as novel over the prior art.

In the drawings, Fig. I is a side view of a suspended unit conveniently embodying my invention.

Fig. II is a plan view of the unit with certain accessories omitted.

Fig. III is a plan view of a thread stand, illustrating its attachment to the unit.

Fig. IV is a plan view of a guiding and manipulating handle.

As shown in Figs. I and II, the bag-closing unit comprises a fastening mechanism 10, such as any suitable type of sewing machine, and a bracket 11 secured thereto, and carrying an (electric) motor 12 for driving the machine 10. The unit is shown as suspended by a flexible cable 13 passing over a pulley sheave 14 and connected to a counterweight 15, so that the whole unit can be readily moved or adjusted up and down by the operator. The flexible cable 13 also allows the unit to be easily shifted horizontally to bring its sewing head 16, needle(s) 17, presser-foot 18, and arm 19 into proper relation to the superposed edges of a sack-mouth 20, and moved along the mouth to sew it shut. The needle 17 is shown in Fig. I as extending horizontally, while the arm 19 and the sewing machine drive shaft 21 extend vertically, or substantially so. The pulley sheave 14 is shown mounted in a swivel-bracket 22, which may be suspended in any suitable way from the ceiling,—or from a supporting carriage on an overhead track (not shown), if such mobility of the unit is desired. As shown in Figs. I and II, the cable 13 is attached to the bracket 11, being suitably secured in an upstanding hollow boss or sleeve 23 on said bracket. A thread-stand 25 is shown in Figs. I and III as clamped on the upper end of the boss 23; it carries two cops of sewing thread 26 for the machine 10, and gallows-like guides 27 for the thread.

As shown in Figs. I and II, the usual base 30 of the machine 10 abuts against a vertical face of the bracket 11 and is secured thereto by a bolt 31. The motor 12 is movably mounted on a horizontal face of the bracket 11, with its driving shaft 32 (substantially) horizontal, and so as to swing horizontally relative to the bracket. The motor 12 is shown attached to a base plate 33 which is pivoted on the horizontal bracket face by a bolt 34 (substantially) parallel with the machine shaft 21. One end of the motor shaft 32 carries a (grooved) driving pulley 35 that is connectible by a quarter-turn belt 36, to a (grooved) driven pulley 37 on the upper end of the machine shaft 21. The shaft 21 is also provided with a brake drum 38, here shown as formed by a plain face of the pulley 37 beside its belt groove. It will be seen that as the motor 12 swings one way or the other about its pivot 34, the belt 36 is tightened so as to drive the machine 10, or relaxed and loosened to leave it idle.

For the purpose of applying and releasing the braking means on the drum 38, and of swinging the motor 12 to operatively connect it to drive the machine 10 and to disconnect it, by tightening and relaxing the belt 36, there is shown a vertical rock shaft 40, (substantially) parallel with the machine shaft 21, and mounted to turn in suitable bearings 41, 41 carried by arms 42, 42 on the bracket 11. The braking means here shown consists of a brake-shoe or face 43 on an arm 44 fast to the upper end of the shaft 40, above its upper bearing 41. For swinging the motor 12, the shaft 40 has an arm 45 that is connected by a (turnbuckle) link-rod 46 to an arm 47 on the motor, here shown as formed by a projecting portion of the plate 33. For convenient manual operation of the shaft 40, a handle or member 48 may be attached to its lower end. Just above this member 48, there is a bearing bracket 49 for the shaft 40, attached to the (cylindrical) machine arm 19, and provided with a handle 50 for manipulating the unit in use. The handle 50 can be conveniently grasped by an operator, who can press the member 48 toward it with the same hand, thereby releasing the brake 43 and swinging the motor 12 counterclockwise (Fig. II) to tighten the belt 36 and drive the machine 10 from the motor. Provision is preferably made for automatically setting the brake 43 and operatively disconnecting the motor 12 whenever the operator releases the shaft 40 by relaxing his pressure on the part 48. For this purpose, there is shown a helical torsion spring 55 around the shaft 40, above the lower bracket arm 42, with one end attached to said arm 42 and the other end attached to a collar 56 fast on said shaft. This spring 55 continually urges shaft 40, brake-arm 44, and motor 12 in a clockwise direction (Fig. II).

In using the unit, the operator manipulates it and shifts it about horizontally or up or down by means of the handle 50. When he is ready to close a bag mouth, he has only to press the member 48 toward the handle 50, as already explained, and to move and guide the machine 10 along the bag mouth by the handle 50. The position of the parts 48, 50 makes all this easy without the operator's changing his own position, or his hold on the handle 50. Besides braking and stopping the machine 10, the brake means 43, 44 serves as a stop to limit the belt-relaxing or loosening swing of the motor 12, so as to avoid throwing the belt off the pulleys 35, 37.

Although reference has been made herein to a preferred embodiment of the invention in which the driving motor of the unit is arranged with its drive shaft horizontal, and in which a belt is employed for operatively connecting it to the fastening mechanism, yet it will be understood that the invention is not entirely confined or limited to either of these particulars, nor to various other specific details illustrated and described.

Having thus described my invention, I claim:

1. A flexibly suspended, freely movable outfit for closing the mouths of filled sacks and the like, comprising a bracket, a fastening-machine mounted on said bracket with its driving shaft substantially vertical, a motor mounted on said bracket for movement in a horizontal plane relative thereto, and having a substantially horizontal shaft, and a belt interconnecting the motor and fastening-machine shafts so as to be tightened to drive the machine, and relaxed to leave it idle, by movements of the motor horizontally relative to the bracket.

2. A flexibly suspended, freely movable outfit for closing the mouths of filled sacks and the like, comprising a bracket, a fastening-machine mounted on said bracket with its driving shaft substantially vertical, a motor mounted on said bracket for movement in a horizontal plane relative thereto, and having a substantially horizontal shaft, a belt interconnecting the motor and fastening-machine shafts so as to be tightened to drive the machine, and relaxed to leave it idle, by movements of the motor horizontally relative to the bracket, brake means for stopping the machine, and means for swinging the motor and thereby relaxing the belt when the brake is applied, and vice-versa.

3. A flexibly suspended, freely movable outfit for closing the mouths of filled sacks and the like, comprising a bracket; a fastening-machine mounted on said bracket with its driving shaft substantially vertical; a motor movably mounted on said bracket with its shaft substantially horizontal, and swingable relative to the bracket in a horizontal plane; and a belt interconnecting the motor and fastening-machine shafts so as to be tightened to drive the machine, and relaxed to leave it idle, by the horizontal swinging of the motor relative to the bracket aforesaid.

4. A flexibly suspended, freely movable outfit for closing the mouths of filled sacks and the like, comprising a bracket, a fastening-machine mounted on said bracket with its driving shaft substantially vertical, a motor mounted on said bracket for movement relative thereto, a belt interconnecting the motor and fastening-machine shafts so as to be tightened to drive the machine, and relaxed to leave it idle, by movements of the motor relative to the bracket, a substantially vertical shaft and brake means for stopping the machine operated thereby, and means operated by movement of said shaft to swing the motor and relax the belt when the brake is applied, and vice versa.

5. A flexibly suspended, freely movable outfit for closing the mouths of filled sacks and the like, comprising a bracket with bearing arms, a fastening-machine mounted on said bracket with its driving shaft substantially vertical, said shaft having thereon a pulley and a brake drum, a motor having a substantially horizontal pulley-equipped shaft and pivotally mounted on said bracket to swing about an axis substantially parallel to said machine shaft, a belt interconnecting said motor and machine shaft pulleys so as to be tightened to drive the machine, and relaxed to leave it idle, by swinging movements of the motor relative to the bracket, brake means for said brake drum, a substantially vertical, manually operable shaft mounted to turn in said bearing arms of said bracket and operatively connected to said motor and brake means to release the brake and swing the motor to tighten the belt when the shaft is turned one way by an operator, and means for automatically applying the brake and swinging the motor to relax the belt when the shaft is released by the operator.

6. A flexibly suspended, freely movable outfit for closing the mouths of filled sacks and the like, comprising a bracket, a fastening-machine mounted on said bracket with its driving shaft substantially vertical, and a motor for driving said fastening-machine drive shaft mounted on said bracket for swinging movement relative to the machine in a horizontal plane, about a vertical axis and operatively connectible to drive said machine by such swinging movement, and means for swinging said motor to connect the same as aforesaid, and vice versa.

7. A flexibly suspended, freely movable outfit for closing the mouths of filled sacks and the like, comprising a bracket, a fastening-machine mounted on said bracket with its driving shaft substantially vertical, a motor for driving said fastening-machine drive shaft mounted on said bracket for swinging movement relative to the machine in a horizontal plane, about a vertical axis, and operatively connectible to drive said machine by such swinging movement, brake means for stopping the machine, means for applying said brake means, and means for swinging the motor and thereby operatively disconnecting it from said machine when the brake is applied by the means aforesaid, and vice versa.

8. A flexibly suspended, freely movable outfit for closing the mouths of filled sacks and the like, comprising a bracket, a fastening-machine mounted on said bracket with its driving shaft substantially vertical, a motor for driving said fastening-machine drive shaft mounted on said bracket for swinging movement relative to the machine in a horizontal plane, about a vertical axis and operatively connectible to drive said machine by such swinging movement, a handle attached to said bracket for manipulating the unit in use, and means for swinging the motor and thereby operatively disconnecting it from said machine, and vice versa, comprising a member adjacent said handle operable by the operator's hand that is holding the said handle.

NORMAN V. CHRISTENSEN.